United States Patent [19]
Kumazawa

[11] Patent Number: 5,513,367
[45] Date of Patent: Apr. 30, 1996

[54] MULTIPROCESSOR SYSTEM HAVING RESPECTIVE BUS INTERFACES THAT TRANSFER DATA AT THE SAME TIME

[75] Inventor: Yukio Kumazawa, Kanagawa, Japan

[73] Assignee: Fuji Xerox Co., Ltd., Tokyo, Japan

[21] Appl. No.: 372,826

[22] Filed: Jan. 13, 1995

Related U.S. Application Data

[63] Continuation of Ser. No. 914,353, Jul. 17, 1992, abandoned.

[30] Foreign Application Priority Data

Jul. 20, 1991 [JP] Japan .................................. 3-180006

[51] Int. Cl.[6] .................................................. G06F 13/00
[52] U.S. Cl. .............. 395/800; 395/200.21; 364/DIG. 1; 364/242.94; 364/239
[58] Field of Search ................................ 395/800, 275, 395/200, 500, 550, 700, 200.2, 200.21, 309–311; 370/85.3, 60, 99.3

[56] References Cited

U.S. PATENT DOCUMENTS

| | | | |
|---|---|---|---|
| 4,272,829 | 6/1981 | Schmidt et al. | 395/800 |
| 4,354,226 | 10/1982 | Flickinger et al. | 395/200 |
| 4,480,307 | 10/1984 | Budde et al. | 395/325 |
| 4,486,852 | 12/1984 | Champlin et al. | 395/325 |
| 4,760,571 | 7/1988 | Schwarz | 370/86 |
| 4,803,485 | 2/1989 | Rypinski | 370/86 |
| 4,809,361 | 2/1989 | Okada et al. | 370/1 |
| 5,001,472 | 3/1991 | Fischer et al. | 370/85.6 |
| 5,003,508 | 3/1991 | Hall | 395/325 |
| 5,046,185 | 9/1991 | Hirai et al. | 370/15 |
| 5,136,580 | 8/1992 | Videlock et al. | 370/60 |
| 5,197,066 | 3/1993 | Sutterlin | 370/85.3 |
| 5,237,567 | 8/1993 | Nay et al. | 370/85.1 |
| 5,400,323 | 3/1995 | Frenzel, III et al. | 370/56 |

OTHER PUBLICATIONS

High–Peformance Computer Architecture, Maruzen, pp. 308–312.
Computer Architecture and Parallel Processing, McGraw–Hill, pp. 481–487.

*Primary Examiner*—Mehmet Geckil
*Attorney, Agent, or Firm*—Finnegan, Henderson, Farabow, Garrett & Dunner

[57] ABSTRACT

A plurality of system buses are provided in association with multiple processors and a memory, respectively. Registers are provided between the system buses so that a packet signal can be sent, in a pipelined form, to bus interfaces connected to the respective system buses. Each bus interface is assigned its own ID value. Counting the number of ID values cyclically at the rise of a clock signal, each register asserts a bus-ID match signal when finding coincidence of the bus-ID value. In response to the asserting of the bus-ID match signal, the associated bus interface provides the packet signal to the system bus. When the bus-ID signal is negated, the associated bus interface takes in the packet signal from the system bus.

3 Claims, 8 Drawing Sheets

MULTIPROCESSOR SYSTEM HAVING RESPECTIVE BUS INTERFACES THAT TRANSFER DATA AT THE SAME TIME

This application is a continuation of application Ser. No. 07/914,353 filed Jul. 17, 1992, now abandoned.

BACKGROUND OF THE INVENTION

The present invention relates to a common-bus-type multiprocessor system and, more specifically, to a multiprocessor system in which system bus data is transferred in a packet form.

As shown in FIG. 17, in a conventional common-bus-type multiprocessor system, bus interfaces 5–8 respectively connected to processors 1–3 and a memory 4 share a single system bus 9. A clock signal 12 is provided from a clock circuit 11 to the respective bus interfaces 5–8, and only one bus interface that has acquired the use right of the system bus 9 according to a bus arbitration signal 10 can use the system bus 9, with one-clock period as the unit use time. That is, at a certain time instant, only one bus interface can use the system bus 9.

FIG. 18 shows a relationship between the clock signal 12 and data on the system bus 9. When, for instance, the processor 1 is using the system bus 9 during a certain clock of the clock signal 12, the other processors 2 and 3 cannot use the system bus 9 during that clock. Mark ① FIG. 18 means that the bus interface 5, that is connected to the processor 1, is using the system bus 9.

When a plurality of bus interfaces that are connected to the system bus 9 request the use of the system bus 9 at the same time, the bus interfaces that have acquired the use right sequentially use the system bus 9 in the order of the use right acquisition. Therefore, when many bus interfaces issue bus-requests at the same time, there occur the problems of the need of waiting for data transfer and a small data quantity that can be transferred at a time. Further, intricate processes are required to implement the bus arbitration.

SUMMARY OF THE INVENTION

In order to solve the above problems in the art, an object of the present invention is to enable respective bus interfaces to transfer data at the same time and each bus interface to transfer a large quantity of data at a time by pipelining a packet signal of a system bus.

According to the invention, a multiprocessor system comprises:

a plurality of processors;

at least one memory;

a plurality of bus interfaces being in association with the processors and the at least one memory, respectively;

a plurality of system buses being in association with the respective bus interfaces; and changeover register means provided between adjacent ones of the system buses, for changing over between a first operation in which the system bus of a preceding stage and the system bus of a following stage are electrically separated to enable transfer of a packet signal from the bus interface associated with the processor of the preceding stage to the system bus of the following stage and a second operation in which a packet signal on the system bus of the preceding stage is sent to the system bus of the following stage in synchronism with a clock signal so as to be transferred to the bus interface associated with the system bus of the following stage.

In the above multiprocessor system, the respective bus interfaces are assigned their own ID values. Different ID values are sequentially provided to each changeover register means, which determines whether the provided ID value coincides with the ID value of the associated bus interface. When the determination is affirmative, the system bus of the preceding stage is electrically separated from that of the following stage to enable the associated bus interface to transfer the packet data to the associated system bus. When the determination is negative, the packet signal on the system bus of the preceding stage is sent to that of the following stage in synchronism with the clock signal so as to be transferred to the associated bus interface.

DESCRIPTION OF THE PREFERRED EMBODIMENTS

Embodiments of the present invention are described hereinafter with reference to the accompanying drawings.

Figure 1:
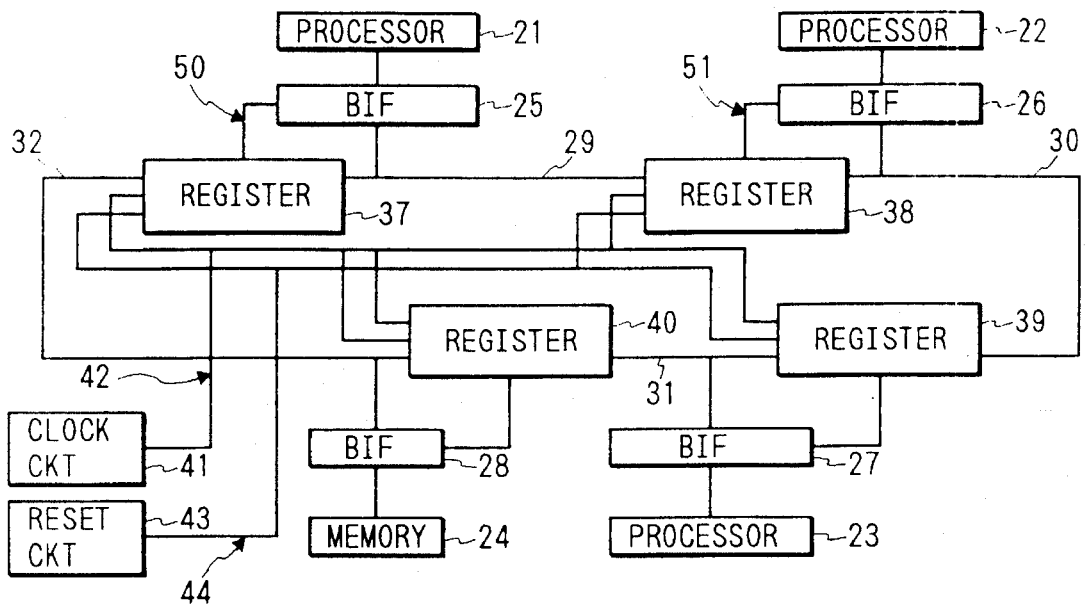
FIG. 1 is a block diagram showing the entire configuration of a multiprocessor system according to a first embodiment of the present invention.

FIG. 1 is a block diagram showing a multiprocessor system according to a first embodiment of the invention. In this multiprocessor system, an original system bus is divided into a plurality of sections, i.e., system buses 29–32 that are associated with processors 21–23 and a memory 24, respectively. In order to send a packet signal on the system bus in a pipelined form, each of registers 37–40 is provided between adjacent ones of bus interfaces (BIFs) 25–28 that are connected to the respective system buses 29–32. The bus interfaces 25–28 are assigned own ID values "1"–"4", respectively.

Figure 2:
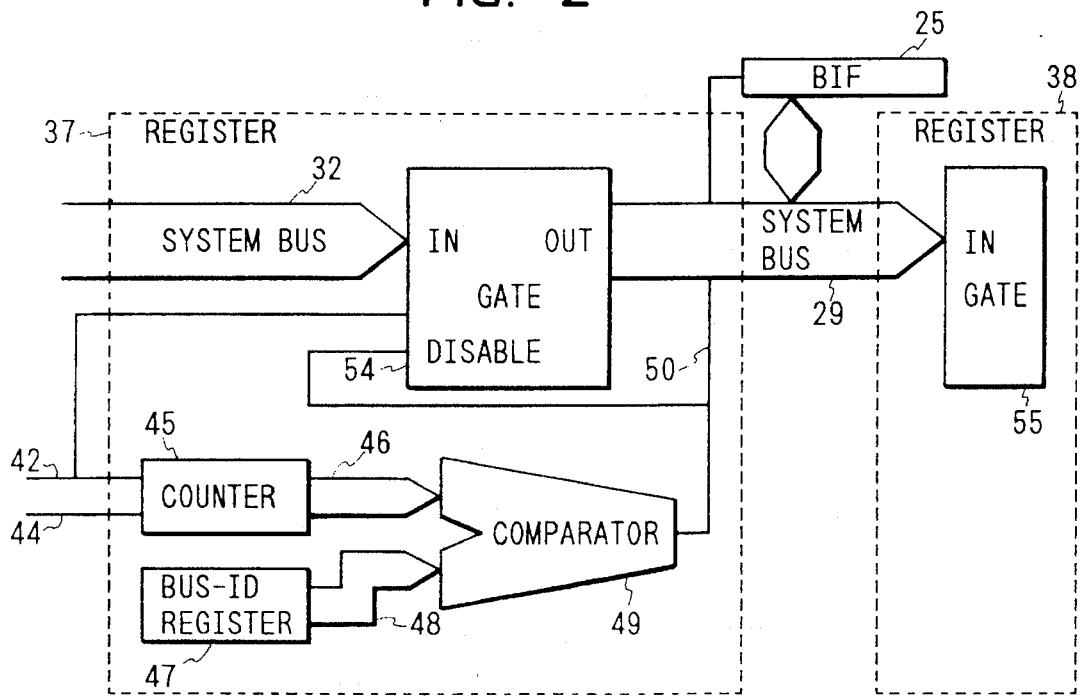
FIG. 2 is a block diagram showing a configuration of a register used in the first embodiment.

FIG. 2 shows a configuration of the register 37 Registers 37–40 also have the same configuration.

The register 37 includes the following components. A counter 45 loads an initial value (i.e., a bus-ID value specific to the associated bus interface) in response to a reset signal 44 provided from a reset circuit 43, and cyclically counts the number of bus-ID values at the rise of the clock signal 42. A bus-ID register 47 indicates the data output cycle, and stores the bus-ID value assigned to the associated bus interface. A comparator 49 compares a count value included in an output 46 of the counter 45 and an ID value included in an output 48 of the bus-ID register 47, and asserts an output signal (bus-ID match signal) 50 when they coincide with each other. A gate 54 takes in data at the fall of the clock signal 42 provided from a clock circuit 41, and outputs data that is input during a period from the fall of the clock signal 42 to the next rise while the bus-ID match signal is negated. Reference numeral 55 represents a gate of the register 38 of the next stage. In the above description, the term "assert" means that a signal is output when the logic is true, and "negate" means that a signal is output when the logic is false.

The bus interface 25 outputs a packet signal when the bus-ID signal 50 is asserted, and takes in a packet signal when it is negated.

Figures 3, 4, 5:
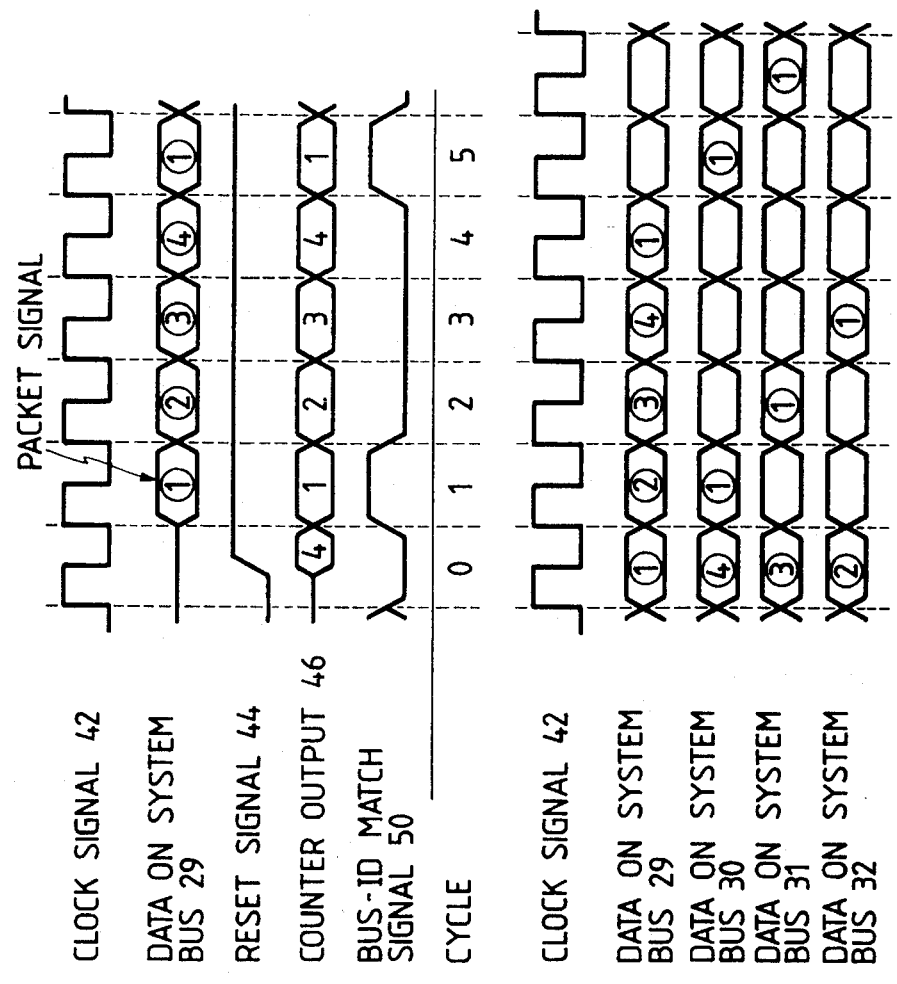
FIG. 3 illustrates a structure of a packet signal.
FIG. 4 is a timing chart showing the operation of the multiprocessor system of the first embodiment.
FIG. 5 is a timing chart showing output timing of packet signals to respective system buses in the first embodiment.

As shown in FIG. 3, the packet signal has a packet structure consisting of data and a header that includes a command (L bits), an address (M bits) of a request destination and an address (N bits) of a request origin.

The operation of the multiprocessor system of the first embodiment is described below.

In the first embodiment, the four bus interfaces 25–28 are connected to the four respective system buses 29–32, which are pipelined using the registers 37–40. As an example, an operation in connection with the bus interface 25, system bus 29 and register 37 is described below, which operation includes three phases.

1) Initial setting phase

In response to the reset signal 44 from the reset circuit 43, initial values are loaded into the counters (counter 45 in the case of the register 37) provided in the respective registers 37–40 (see the 0th cycle of FIG. 4). More specifically, the initial value in the case of the register 37 is the bus-ID value "4", and the initial values in the case of the registers 38–40 are the bus-ID values "1", "2" and "3", respectively.

When the reset signal 44 is negated, the counter 45 starts its counting operation from the rise of the next clock to produce the outputs of "1"–"4" in a cyclic manner. The number "4" is identical to the number of bus interfaces.

2) Data output phase

In each cycle of the clock signal 42, the counter output 46 and the bus-ID output 48 are compared by the comparator 49. If the two values are identical, the bus-ID match signal 50 is asserted during one clock, i.e., one cycle. While the bus-ID match signal 50 is asserted, the gate 54 is prohibited from producing its output, and is rendered in a high-impedance state.

The bus interface 25 recognizes from the asserting of the bus-ID match signal 50 that it can produce its output in the current cycle.

If there exists a data read or write request from the processor 21, the bus interface 25 produces a packet signal including a command of the request, an address of a request origin (e.g., bus-ID value "1") and an address of a request destination (e.g., a memory address), and provides it to the system bus 29. If there exists no request from the processor 21, the bus interface 25 performs no operation.

3) Data input phase

In each cycle of the clock signal 42, the counter output 46 and the bus-ID output 48 are compared by the comparator 49, and the bus-ID match signal 50 is rendered in a negated state when the two values are not identical. When the bus-ID match signal 50 is in the negated state, the gate 55 provides the system bus 29 with the data of the preceding clock on the system bus 32. The bus interface 25 samples the packet signal on the system bus 29 in every clock period, and analyzes the address of the transfer destination. If the command is directed to the bus interface 25, the bus interface 25 takes in the packet signal and informs the processor 21 of the input of the packet signal to perform a corresponding process.

With the above processing, as shown in FIG. 5, the bus interfaces 25–28 can use the different system buses 29–32 at the same time instant. In FIG. 5, the circled numbers indicate the bus-ID values; in the first cycle, the system buses 29–32 are used at the same time by the bus interfaces having the bus-ID values "1", "4", "3" and "2", respectively.

Figure 6:
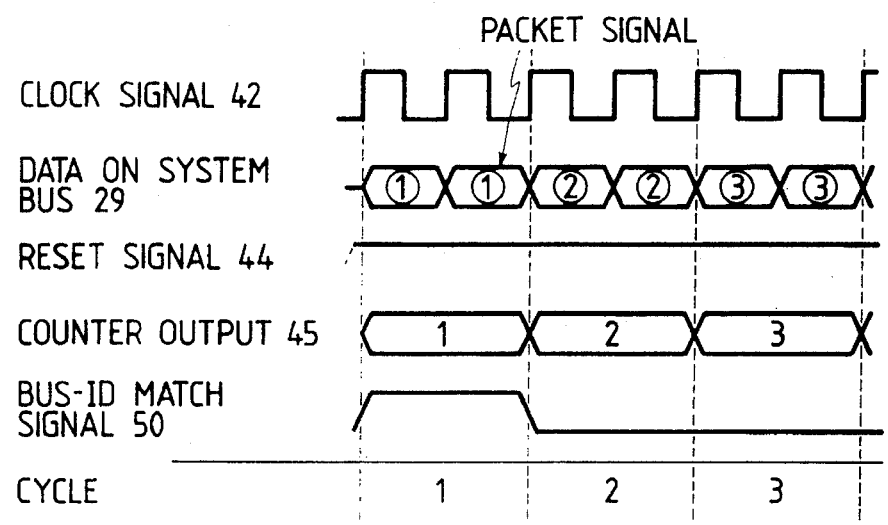
FIG. 6 is a timing chart showing an operation of the multiprocessor system of the first embodiment in such a case that the period of a clock signal is divided in a counter to double the frequency.

The above embodiment, in which each bus interface is given the output allowable time in every clock period, can be modified such that the counter 45 divides the period of the received clock signal 42 into n sections to increase the number of cycles in which the bus interface can concurrently output data to n times the original number. FIG. 6 is a timing chart showing the case of n=2.

Figure 7:
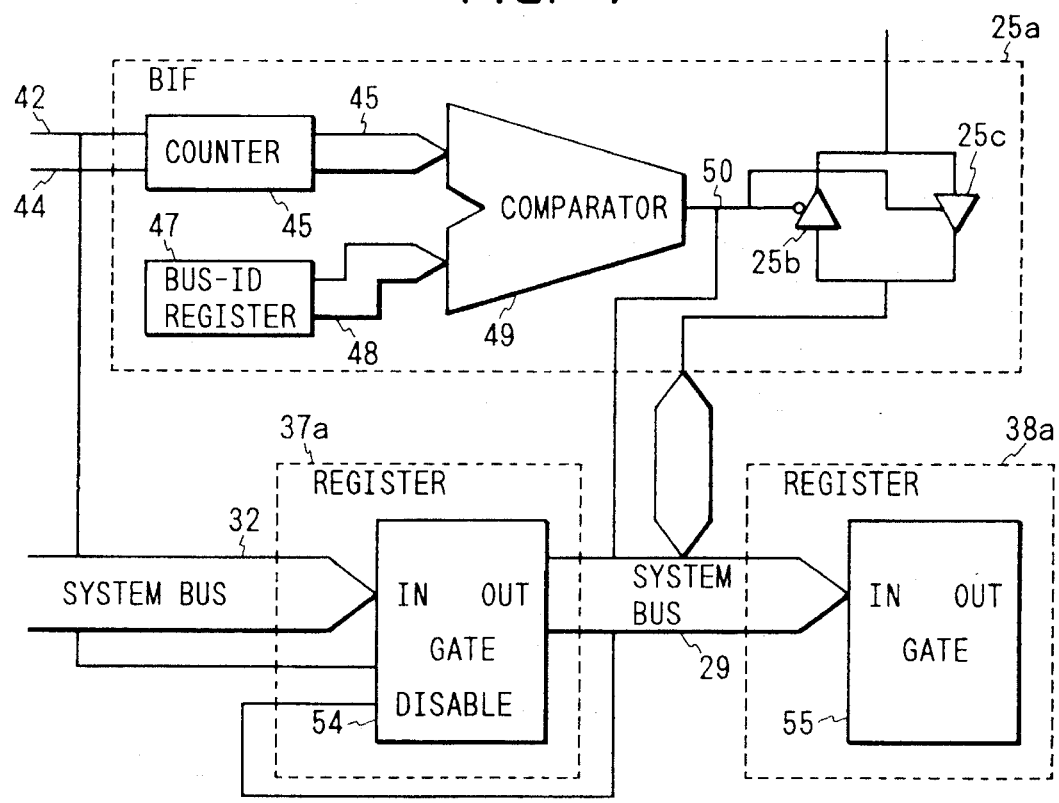
FIG. 7 is a block diagram showing a modification in which a bus-ID register, counter and comparator are incorporated in a bus interface.

While in FIG. 2 the register 37 includes the bus-ID register 47, counter 45 and comparator 49, these circuit elements may be provided in a bus interface 25a as shown in FIG. 7 to simplify the configuration of registers 37a, 38a, etc. In FIG. 7, reference symbols 25b and 25c are buffers originally incorporated in the bus interface.

Figure 8:
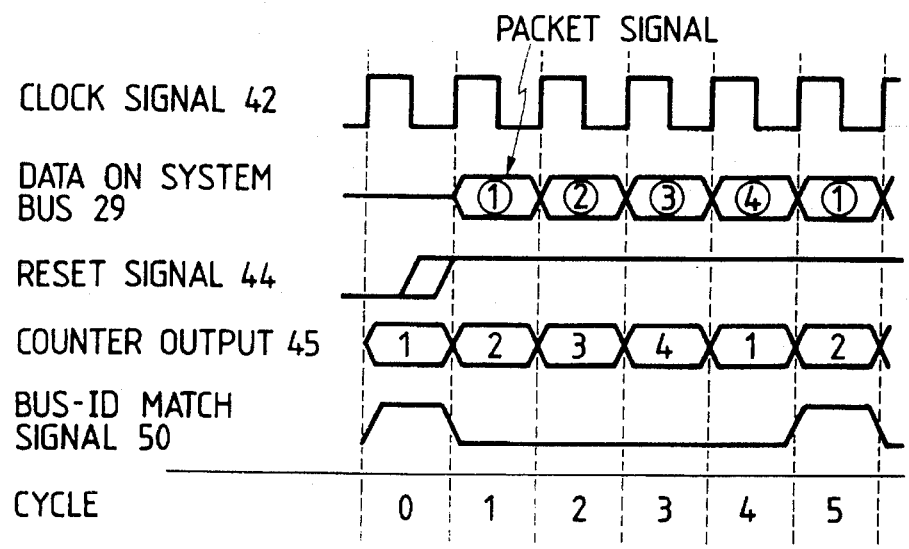
FIG. 8 is a timing chart showing an operation of a case in which a bus-ID match signal is output one cycle before the cycle in which the bus interface outputs data.

Further, the ID value of the preceding register may be employed as the ID value that is loaded in the resetting. In this case, the bus-ID match signal is output during the cycle preceding the cycle of the data output, and the bus interface is informed of the data output time in advance, which can provide an extra time until the data output. FIG. 8 shows an example in which the bus-ID match signal is output one-cycle period prior to the data output.

A multiprocessor system according to a second embodiment is described below. A configuration of the multiprocessor system of the second embodiment is shown in FIG. 9, in which the parts corresponding to those of the FIG. 1 embodiment are represented by the same reference symbols.

Figure 9:
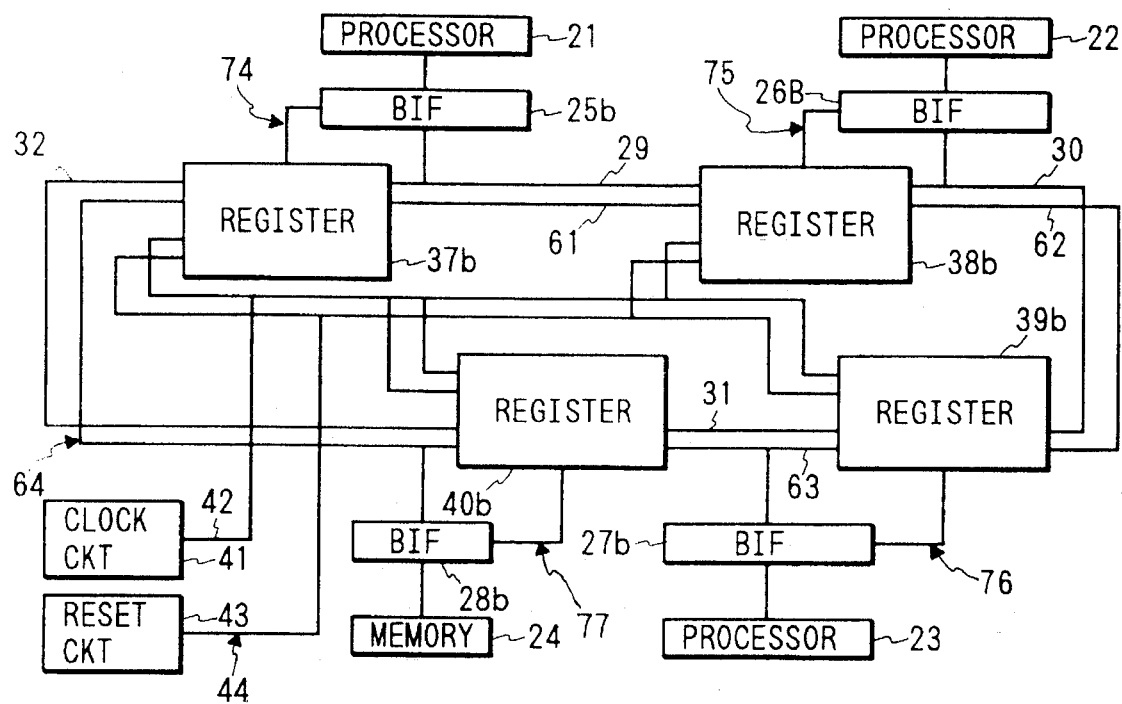
FIG. 9 is a block diagram showing the entire configuration of a multiprocessor system according to a second embodiment of the invention.

The multiprocessor system of FIG. 9 has a construction similar to that of FIG. 1. Bus interfaces 25b–28b are provided in association with processors 21–23 having a built-in cache memory and a memory 24, respectively. Divisional system buses 29–32 are provided in association with the respective bus interfaces 25b–28b. Registers 37*b*–40*b* are provided between the system buses 29–32, and packet-ID buses 61–64 are provided between the registers 37*b*–40*b*. The registers 37*b*–40*b* send bus-ID match signals 74–77 to the bus interfaces 25*b*–28*b*, respectively.

Figure 10:
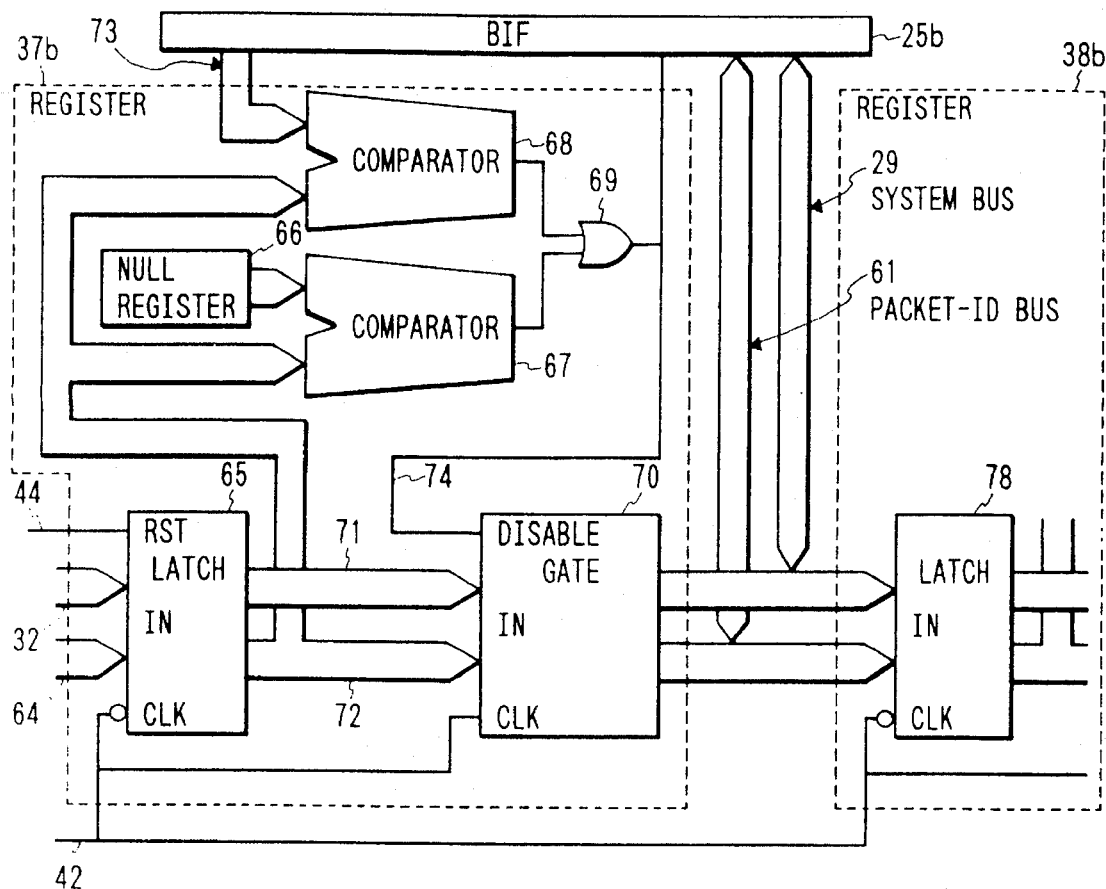
FIG. 10 is a block diagram showing a configuration of a register used in the second embodiment.

FIG. 10 shows a configuration of the register 37*b* which represents the registers 37*b*–40*b* having the same configuration.

The register 37*b* includes the following components. In order to pipeline the packet signal on the system bus, a latch 65 latches, at the fall of the clock signal 42, the packet signal and ID data representing the bus interface that has output the packet signal. A null register 66 holds and outputs a value "0". A comparator 67 compares the above ID data with "0", and outputs a match signal when they are identical. A comparator 68 compares an ID value of a bus-ID output 73 from the bus interface 25*b* with the latched ID data. An OR circuit 69 outputs a logical sum of the outputs of the two comparators 67 and 68. Receiving the outputs of the latch 65, a gate 70 passes or interrupts, in accordance with the output states of the comparators 67 and 68, the packet signal and the ID data output indicating the bus interface that has output the packet signal, from the rise of the clock with the one-clock period as the unit time. The bus interface 25*b* inputs/outputs, as the packet signal, data requested by the processor in accordance with the output state of the OR circuit 69. Reference numeral 78 represents a latch provided in the register 38*b*.

The operation of the multiprocessor system of the second embodiment, which is shown in FIGS. 9 and 10, is described below.

As in the case of the first embodiment, in the multiprocessor system of the second embodiment the four bus interfaces 25*b*–28*b* are connected to the four respective system buses 29–32, which are pipelined with the use of the registers 37*b*–40*b*. The operation in connection with the bus interface 25*b*, system bus 29 and register 37*b* is described, as an example, for each of various cases.

In FIG. 10, the latch 65 receives the signals from the system bus 32 and packet-ID bus 64, the clock signal 42 and the reset signal 44, and outputs the latch signal 71 including the packet signal and the latch signal 72 including the ID value of the bus interface that has output the packet signal.

1) Initial reset

In response to the reset signal 44, that is generated by the reset circuit 43, for instance, at the time of the power-on and a system error occurrence, the latch 65 produces the outputs (including the latch signal 72) having a value "0". As a result, the output control of the gate 70 is disabled, and the system bus 29 is rendered in a high-impedance state (see the 0th cycle of FIG. 11). The similar operation is performed in the other registers 38*b*–40*b*, and the system buses 30–32 are also rendered in a high-impedance state.

2) Latch signal 72 is equal to output of null register 66

The register 37*b* latches the received gate outputs (i.e., data on the system bus and the packet-ID bus) of the preceding stage at each fall of the clock signal 42, and outputs the latch signals 71 and 72. The comparator 67 compares the latch signal 72 with the output of the null register 66, and the comparator 68 compares the latch signal 72 with the bus-ID output 73 of the bus interface 25*b*. If either comparator detects a coincidence, the OR circuit 69 asserts the bus-ID match signal 74. This case is described in detail while being further divided into the following cases.

If the data value of the latch signal 72 that is produced when the latch 65 latches the output of the packet-ID bus 64, i.e., the ID value of the bus interface that has output the packet signal currently on the system bus 32 is equal to "0", the output of the comparator 67 is asserted to thereby assert the bus-ID match signal 74, i.e., the output of the OR circuit 69. When the bus-ID match signal 74 is asserted, the output of the gate 70 is disabled to provide a high-impedance state. The bus interface 25*b* recognizes from the asserting of the bus-ID match signal 74 that it is now allowed to output the packet signal to the system bus 29.

2-1) There exists output data of read/write request from processor

Figure 11:
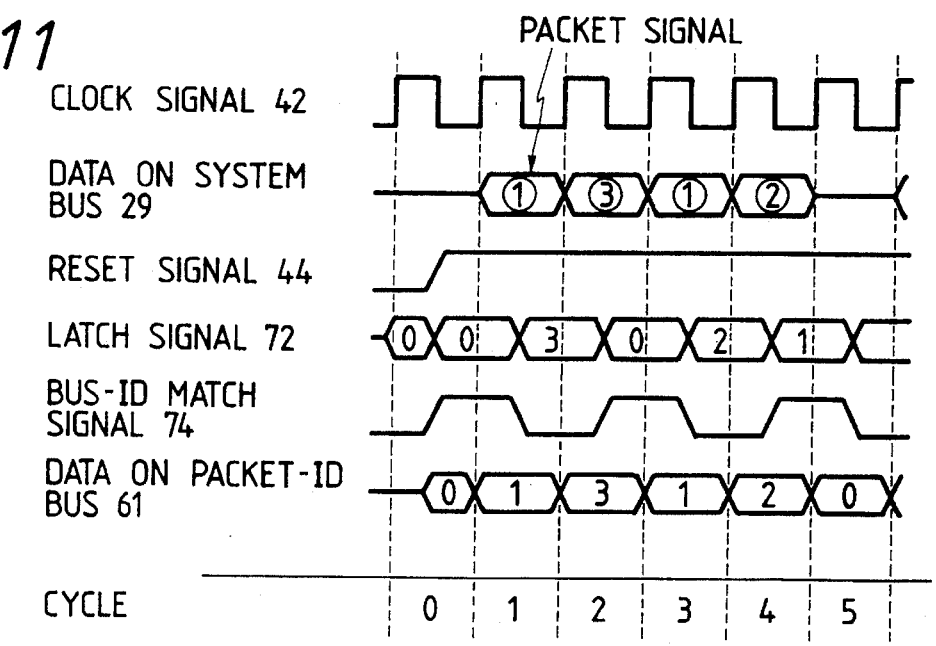
FIG. 11 is a timing chart showing the operation of the multiprocessor system of the second embodiment.

When a cache memory (not shown) incorporated in the processor issues a read/write request with respect to the memory 24, for instance, by a cache miss, the bus interface 25*b* sends a request packet signal to the system bus 29 and the ID value ("1" in this example) of the bus interface 25*b* to the packet-ID bus 61 (see the 1st and 3rd cycles of FIG. 11).

2-2) There is no output data of read/write request from processor

Where the processor 21 is not requesting an external memory operation, in which case the bus interface 25*b* need not output a packet signal, the bus interface 25*b* sends data "0" to the packet-ID bus 61 to indicate that there is no effective data on the system bus 29 (see the 5th cycle of FIG. 11).

3) Latch signal 72 is equal to bus-ID output 73

When a packet signal that was output n-cycles before the current cycle has gone through one round of the pipelined path of the system buses 29–32, the latch signal 72 coincides with the bus-ID output 73 and therefore the bus-ID match signal is asserted. As a result of the asserting of the bus-ID match signal 74, the output of the gate 70 is disabled to provide a high-impedance state. Since this packet signal is the one which the bus interface 25*b* itself output previously, the bus interface 25*b* need not output a packet signal this time. The bus interface 25*b* recognizes from the asserting of the bus-ID match signal 74 that it is in the state of being allowed to output a packet signal.

3-1) There exists output data of read/write request from processor

The operation in this case is similar to that of item 2-1) described above.

3-2) There is no output data of read/write request from processor

The operation in this case is similar to that of item 2-2) described above.

4) Latch signal 72 is not equal to either of bus-ID output and null register output The fact that neither of the outputs of the comparators 67 and 68 are asserted, that is, the bus-ID match signal 74 is not asserted indicates that in that cycle the latch signal 71 includes an effective packet signal which has been output from another bus interface. The gate 70 sends the latch signal 71 to the system bus 29, and the latch signal 72 to the packet-ID bus 61. The bus interface 25*b* recognizes from the negating of the bus-ID signal 74 that a packet signal is being input thereto, and takes in the packet signal from the system bus 29.

Figure 12:
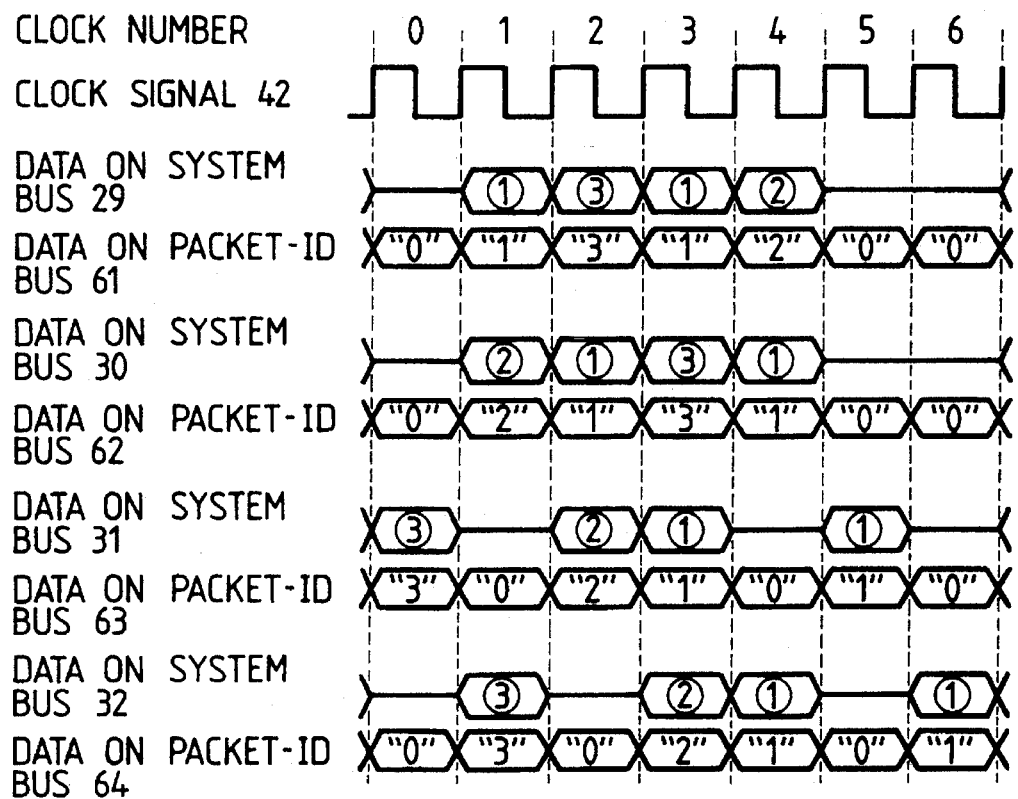
FIG. 12 is a timing chart showing output timing of packet signals to respective system buses in the second embodiment.

With the above processing, as shown in FIG. 12, the different bus interfaces 25*b*–28*b* can use the system buses 29–32 at the same time instant. In FIG. 12, each of the circled numbers indicates the ID value on the system bus, and each of the numbers in double quotation marks indicates the ID value on the packet-ID bus.

Figure 13:
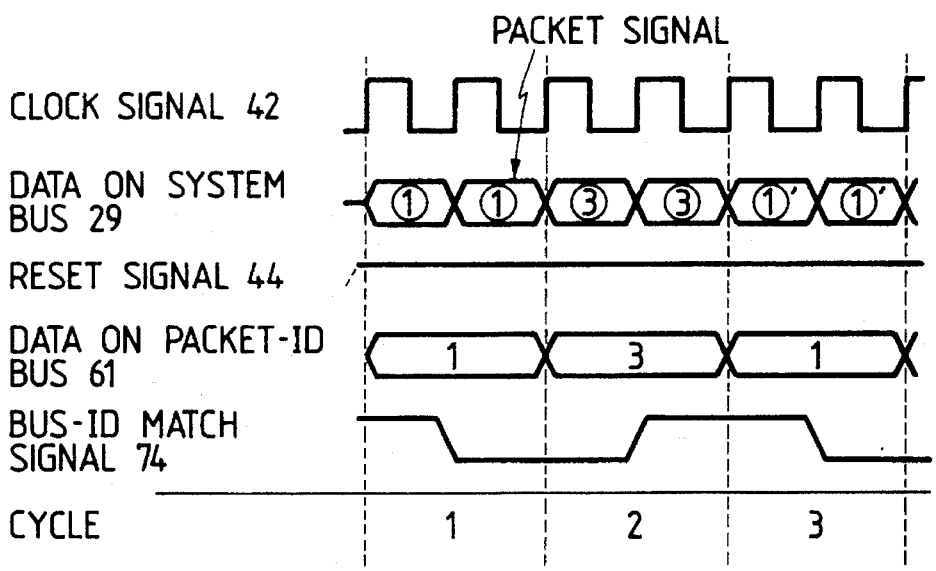
FIG. 13 is a timing chart showing an operation of the multiprocessor system of the second embodiment in such a case that the period of a clock signal is divided in a counter to double the frequency.

As in the case of the first embodiment, the second embodiment of FIGS. 9 and 10 can be modified such that the counter divides the period of the received clock signal into n sections to increase the number of cycles in which the bus interface can concurrently output data to n times the original number. FIG. 13 is a timing chart showing the case of n=2.

Figure 14:
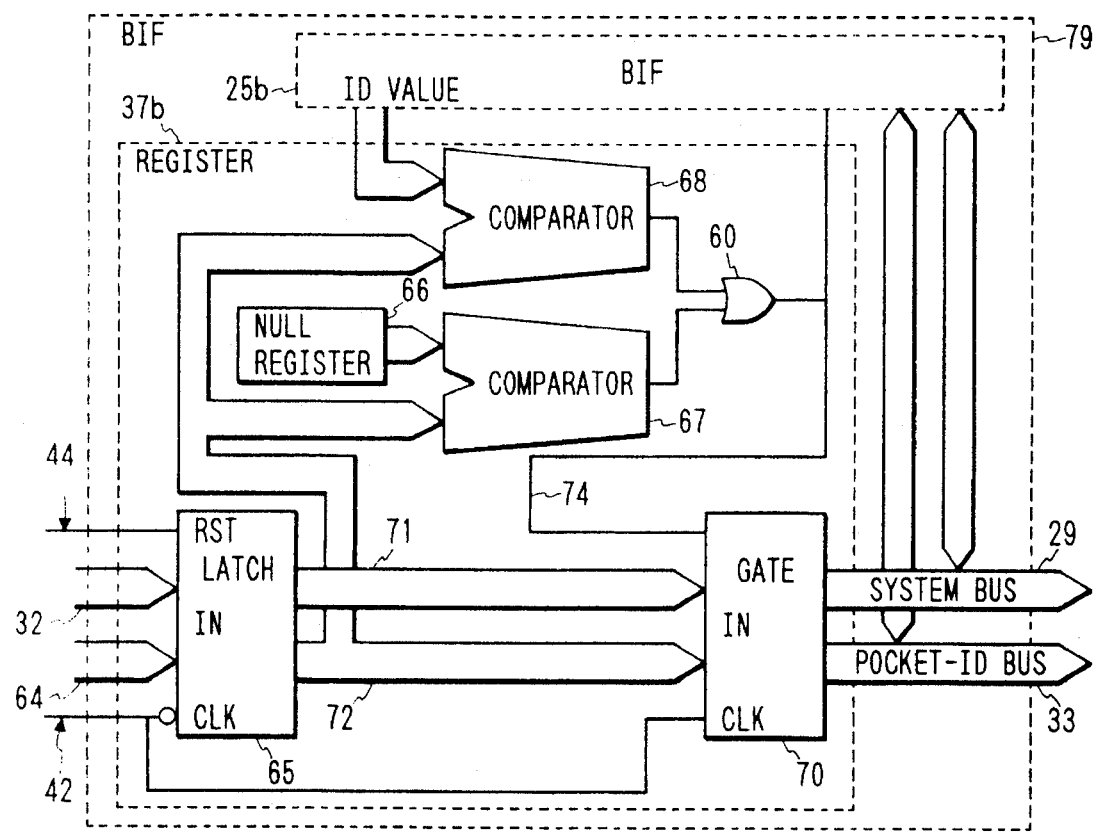
FIG. 14 is a block diagram showing a modification in which a latch, gate, comparator and OR circuit are incorporated in a bus interface.

While in FIG. 10 the register 37b and the bus interface 25b are separate blocks, a bus interface block 79 may be provided by combining the register 37b and the bus interface 25b as shown in FIG. 14. With this construction, the register 37b and the bus interface 25b can be incorporated in a single integration circuit chip, which will contribute to the increase of the integration degree of the circuit.

Although the second is described above with respect to the case in which the cache memory is incorporated in each of the processors, it is noted that the second embodiment can also be applied to a multiprocessor system in which processors do not have a built-in cache memory.

The packet-ID buses are not a requisite of the invention, but can be omitted by determining the input/output timing of the packet signal by decoding the data included in the packet signal and indicating the transmitting origin. Such a multiprocessor system according to a third embodiment is described below with reference to FIGS. 15 and 16.

Figure 15:
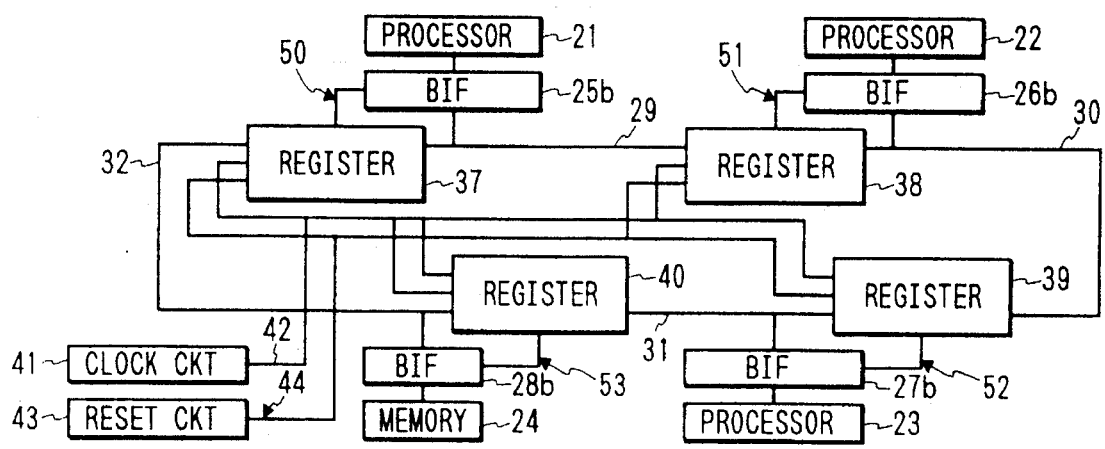
FIG. 15 is a block diagram showing the entire configuration of a multiprocessor system according to a third embodiment of the invention.
Figure 16:
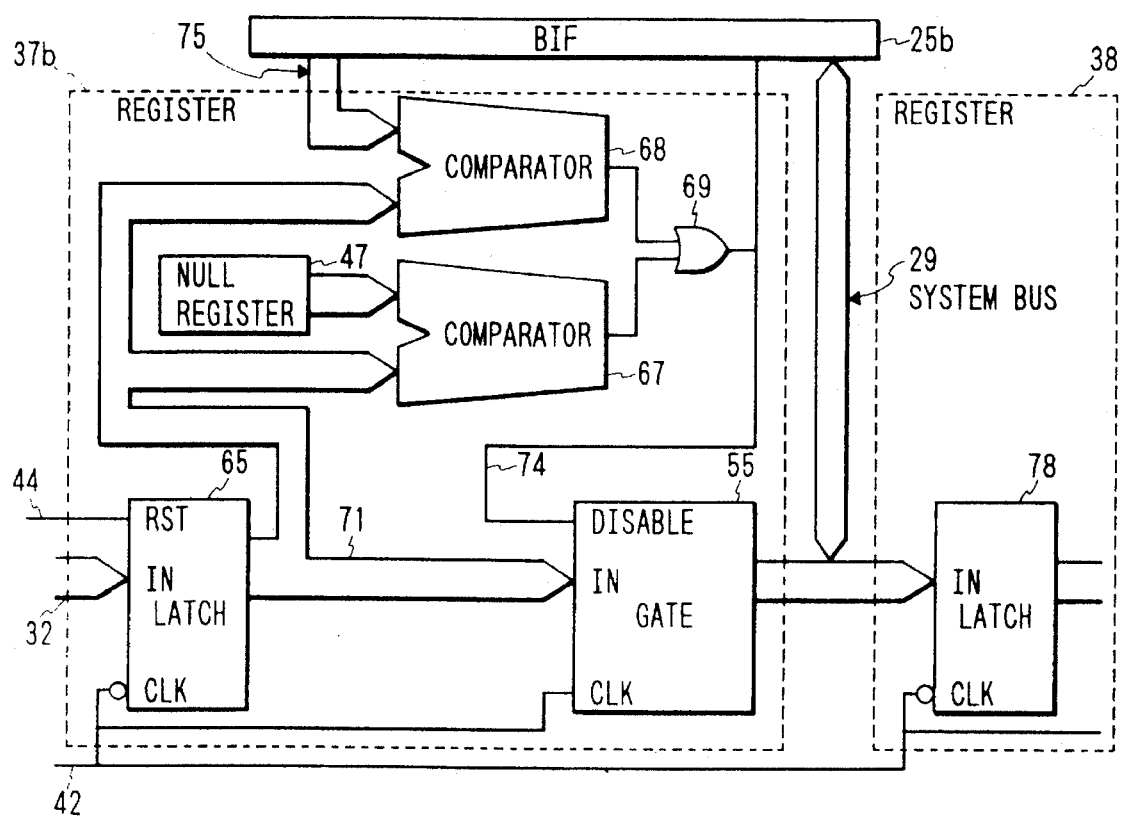
FIG. 16 is a block diagram showing a configuration of a register used in the third embodiment.
Figure 17:
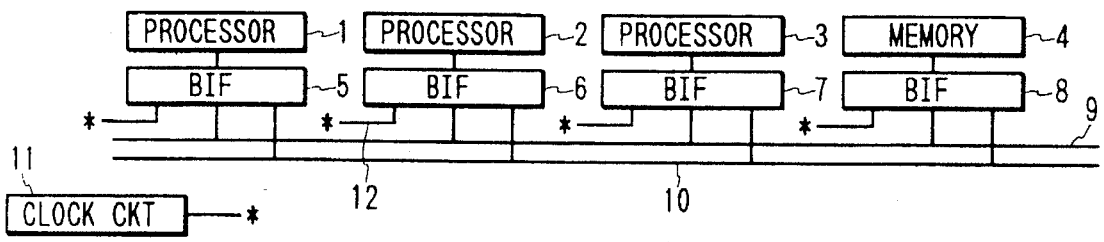
FIG. 17 is a block diagram showing a configuration of a conventional multiprocessor system.
Figure 18:
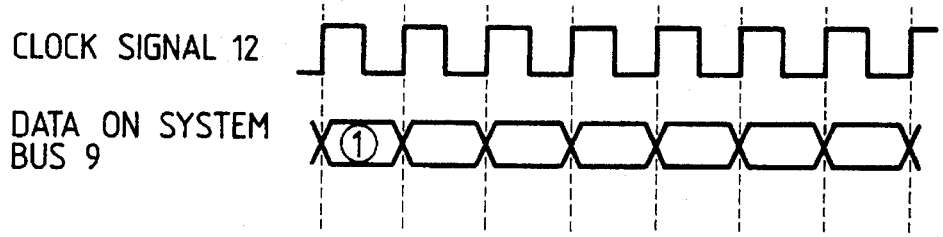
FIG. 18 is a timing chart showing output timing of packet signals in the conventional system of FIG. 17.

A multiprocessor system shown in FIG. 15 has a configuration similar to that of FIG. 9, and is different in that the multiprocessor system of FIG. 15 does not employ packet-ID buses. As shown in FIG. 16, only the latch signal 71 is output from the latch 65, to be provided to the comparators 67 and 68 and the gate 55.

The operation of the multiprocessor system according to the third embodiment is described below in a relatively brief manner.

N-bit data indicating the request origin, that is shown in FIG. 3, is sent to the comparators 67 and 68. All the latch signal 71 is input to the gate 55. The comparators 67 and 68 decode the N-bit data included in the latch signal 71 and indicating the request origin, and thereby recognizes from which bus interface the packet signal was issued. If the content of the N-bit data is "0" or equal to the bus-ID output 75, the output of the comparator 67 is asserted and thereby the output of an OR circuit 69 are asserted. When there is no effective packet signal on the system bus 32, the system bus 32 is driven to have data "0".

Where there exists a read/write request from the processor, the bus interface 25b sends a packet signal to the system bus 29. On the other hand, when there is no read/write request from the processor, the bus interface 25b drives the system bus 29 so that it has data "0".

When the content of the N-bit data is not "0", the gate 55 outputs the content of the data on the system bus 32.

As described in the foregoing, according to the invention, the pipelining of the system bus can provide the advantages that the respective bus interfaces can concurrently perform the input/output operation of the packet signal with respect to the system bus, which enables the increase of the transfer data capacity. Further, the determination of the data output time obviates the need of arbitrating a competition to acquire the use right of the bus, which will simplify the processes.

What is claimed is:

1. A multiprocessor system, comprising:

a plurality of processors;

a plurality of bus interfaces, each bus interface being individually coupled to a processor of the plurality of processors for transferring packets of data during a single clock cycle;

a plurality of system buses for sending a data packet transferred by the corresponding bus interface from a preceding system bus to a following system bus during a single clock cycle, each system bus being individually coupled to a respective bus interface of the plurality of bus interfaces;

a plurality of changeover registers, each changeover register being coupled to and between adjacent pairs of the system buses to connect the plurality of system buses in a loop, for changing over during the same single clock cycle from a first operation in which the preceding system bus and the following system bus of an adjacent pair of system buses are electrically separated by placing the changeover register in a high impedance state to enable transfer of a packet signal from the bus interface coupled to the following system bus onto the following system bus and a second operation in which a packet signal on the preceding system bus is sent to the following system bus, wherein each of the plurality of changeover registers includes:

a counter for producing output values in a cyclic manner;

an ID register for storing an ID value specific to a respective one of the plurality of changeover registers;

a comparator for comparing an output value of the counter with the ID value stored in the corresponding ID register, and for producing an ID match signal, enabling the bus interface coupled to the following system bus to output the packet signal when the two values are identical; and a gate for latching the packet signal on the preceding system bus, the gate being rendered in a floating state to enable the transfer of the packet signal from the bus interface coupled to the following system bus in response to the ID match signal, and for sending the latched packet signal to the following system bus in response to the absence of the ID match signal.

2. The multiprocessor system of claim 1, further comprising an ID bus provided between adjacent ones of the plurality of system buses, for transmitting an ID value indicating a transmission origin of the packet signal.

3. A multiprocessor system, comprising:

a plurality of processors;

a plurality of bus interfaces, each bus interface being individually coupled to a processor of the plurality of processors for transferring packets of data during a single clock cycle;

a plurality of system buses for sending a data packet transferred by the corresponding bus interface from a preceding system bus to a following system bus during a single clock cycle, each system bus being individually coupled to a respective bus interface of the plurality of bus interfaces;

a plurality of changeover registers, each changeover register being coupled to and between adjacent pairs of the system buses to connect the plurality of system buses in a loop, for changing over during the same single clock cycle from a first operation in which the preceding system bus and the following system bus of an adjacent pair of system buses are electrically separated by placing the changeover register in a high impedance state to enable transfer of a packet signal from the bus interface coupled to the following system bus onto the following system bus and a second operation in which a packet signal on the preceding system bus is sent to the following system bus, wherein each of the plurality of changeover registers includes:

a latch for latching the packet signal on the preceding system bus and the ID value from the preceding ID bus;

a register for storing a predetermined value;

a first comparator for comparing the latched ID value with the stored predetermined value;

a second comparator for comparing the latched ID value with an ID value specific to the changeover register;

an OR gate for producing an ID match signal for enabling the bus interface coupled to the following system bus to output the packet signal in response to the detection of a coincidence by either one of the first or second comparator means; and a gate for receiving the latched packet signal and ID value from the latch, the gate being rendered in a floating state to enable the transfer of the packet signal from a bus interface coupled to the following system bus onto the following system bus in response to the ID match signal, and for sending the latched packet signal to the following system bus and the latched ID value to the following ID bus in response to the absence of the ID match signal.

* * * * *